(12) United States Patent
Koshurba et al.

(10) Patent No.: US 6,512,194 B1
(45) Date of Patent: Jan. 28, 2003

(54) MULTI-ARM WELD GUN

(75) Inventors: Gregory J. Koshurba, Macomb, MI (US); Arthur C. Mason, Harrison Township, MI (US); Stephen D. Tracey, Northville, MI (US)

(73) Assignee: DCT, Inc., Sterling Heights, MI (US)

( * ) Notice: Subject to any disclaimer, the term of this patent is extended or adjusted under 35 U.S.C. 154(b) by 100 days.

(21) Appl. No.: 09/715,727

(22) Filed: Nov. 17, 2000

Related U.S. Application Data

(60) Provisional application No. 60/166,510, filed on Nov. 19, 1999, and provisional application No. 60/166,449, filed on Nov. 19, 1999.

(51) Int. Cl.$^7$ .............................................. B23K 9/32
(52) U.S. Cl. ....................... 219/86.25; 219/87; 219/91.2
(58) Field of Search ....................... 219/80, 86.1, 86.25, 219/87, 89, 90, 91.2

(56) References Cited

U.S. PATENT DOCUMENTS

| | | | |
|---|---|---|---|
| 3,205,337 A | * | 9/1965 | Hiemenz et al. ............ 219/87 |
| 4,162,387 A | | 7/1979 | De Candia |
| 4,233,488 A | | 11/1980 | Schwartz |
| 4,280,182 A | | 7/1981 | Mickowski |
| 4,488,135 A | | 12/1984 | Schwartz |
| 4,503,312 A | | 3/1985 | Nakata et al. |
| 4,577,085 A | | 3/1986 | Burgher et al. |
| 4,656,327 A | | 4/1987 | Wilcox |
| 4,661,680 A | | 4/1987 | Swensrud |
| 4,703,158 A | * | 10/1987 | Burgher et al. ............. 219/119 |
| 4,728,137 A | | 3/1988 | Hamed et al. |
| 4,760,633 A | | 8/1988 | Dacey, Jr. |
| 4,813,125 A | | 3/1989 | Dacey, Jr. |
| 4,827,595 A | | 5/1989 | Dacey, Jr. |
| 4,835,730 A | | 5/1989 | Shimano et al. |
| 4,852,047 A | | 7/1989 | Lavallee et al. |
| 4,884,431 A | | 12/1989 | Dacey, Jr. |
| 4,894,908 A | | 1/1990 | Haba, Jr. et al. |
| 4,896,087 A | | 1/1990 | Omaga et al. |
| 4,912,343 A | | 3/1990 | Stuart |
| 4,928,388 A | | 5/1990 | Dacey, Jr. |
| 4,931,617 A | | 6/1990 | Toyoda et al. |
| 5,014,208 A | | 5/1991 | Wolfson |
| 5,025,390 A | | 6/1991 | Daggett |
| 5,050,088 A | | 9/1991 | Buckler et al. |

(List continued on next page.)

FOREIGN PATENT DOCUMENTS

| | | |
|---|---|---|
| DE | 2 305 529 | 8/1974 |
| DE | 39 37 643 A1 | 5/1991 |
| DE | 41 37 574 A1 | 5/1993 |

(List continued on next page.)

OTHER PUBLICATIONS

Patent Abstracts of Japan, vol. 007, No. 288 (E–218), Dec. 22, 1983 & JP 58 165307 A (Tokyo Shibaura Denki KK), Sep. 30, 1983.

(List continued on next page.)

*Primary Examiner*—M. Alexandra Elve
*Assistant Examiner*—Kiley Stoner
(74) *Attorney, Agent, or Firm*—Rader, Fishman & Grauer PLLC

(57) ABSTRACT

A multiple arm weld includes at least two weld gun arms where one arm retracts away from mating work pieces while at least one other arm remains operational, thus allowing a multiple arm weld gun to act as a single arm weld gun. Once one or more weld gun arms is retracted, the remaining weld gun arms may be repositioned with respect to the work pieces in a space not previously accessible to the multiple arm weld gun before retraction of an arm.

15 Claims, 2 Drawing Sheets

U.S. PATENT DOCUMENTS

| | | | |
|---|---|---|---|
| 5,099,158 A | | 3/1992 | Stuart et al. |
| 5,103,551 A | | 4/1992 | Tamura et al. |
| 5,111,019 A | * | 5/1992 | Torii et al. .................. 219/116 |
| 5,132,601 A | | 7/1992 | Ohtani |
| 5,174,489 A | | 12/1992 | Mason |
| 5,187,398 A | | 2/1993 | Stuart et al. |
| 5,229,568 A | | 7/1993 | Gobez et al. |
| 5,262,609 A | | 11/1993 | Nowak et al. |
| 5,285,373 A | | 2/1994 | Watanabe et al. |
| 5,293,157 A | | 3/1994 | Yakou |
| 5,321,255 A | | 6/1994 | Boyer |
| 5,341,054 A | | 8/1994 | Tal et al. |
| 5,378,868 A | | 1/1995 | Burkhardt et al. |
| 5,400,943 A | | 3/1995 | Rossi |
| 5,410,233 A | | 4/1995 | Carbaugh, Jr. et al. |
| 5,436,422 A | | 7/1995 | Nishiwaki et al. |
| 5,504,299 A | | 4/1996 | Heckendorn |
| 5,632,911 A | | 5/1997 | Wigle et al. |
| 5,742,022 A | | 4/1998 | Crawford et al. |
| 5,990,442 A | * | 11/1999 | Suita et al. .............. 219/86.25 |
| 6,059,169 A | * | 5/2000 | Nihei et al. ................. 228/44.3 |
| 6,066,824 A | | 5/2000 | Crawford et al. |
| 6,271,496 B1 | * | 8/2001 | Domschot .................. 219/86.8 |
| 6,429,397 B1 | * | 8/2002 | Sun et al. ................ 219/86.25 |

FOREIGN PATENT DOCUMENTS

| | | |
|---|---|---|
| DE | 44 32 475 A1 | 3/1995 |
| EP | 0 133 929 A2 | 3/1985 |
| EP | 0 350 013 A | 1/1990 |
| EP | 0 514 696 A1 | 11/1992 |
| EP | 0 649 700 A1 | 9/1994 |
| FR | 2 118 096 | 12/1971 |
| FR | 2 447 126 | 1/1979 |
| FR | 2 692 507 A | 12/1993 |
| JP | 56160885 | 12/1981 |
| JP | 58165307 | 9/1983 |
| JP | 61150786 | 7/1986 |
| JP | 405192771 A * | 8/1993 |
| WO | WO 80/00229 | 2/1980 |
| WO | WO 96/33040 | 10/1996 |

OTHER PUBLICATIONS

Patent Abstracts of Japan, vol. 006, No. 045 (M–118), Mar. 20, 1982 & JP 56 160885 A (Nippon Abionikusu KK) Dec. 10, 1981.

Patent Abstracts of Japan, vol. 010, No. 353 (M–539), Nov. 28, 1986 & JP 61 150786 A (Nissan Motor Co. Ltd), Jul. 9, 1986.

PCT International Search Report in International Application No. PCT/US99/16437 dated Oct. 10, 2000.

PCT International Search Report in International Application No. PCT/US00/31540 May 25, 2001.

PCT International Search Report in International Application No. PCT/US00/31798 dated Feb. 23, 2001.

De–Sta–Co (A Dover Resources Company) Brochure: pp. 53–54 (no date).

IBM Technical Disclosure Bulletin, vol. 17, No. 11, Apr. 1975 (1975–04), XP–000918142, "Welding Electrode and Holder".

ISI Power & Manual Industrial Clamps; The ISI Companies; Copyright 1989.

* cited by examiner

MULTI-ARM WELD GUN

CROSS REFERENCE TO RELATED APPLICATIONS

This application claims benefit of U.S. Provisional Application Serial Nos. 60/166,510, and 60/166,449, both filed Nov. 19, 1999, the contents of which are incorporated by reference in their entirety. Applicants also note the existence of U.S. patent application Ser. No. 09/321,931, filed May 28, 1999, now U.S. Pat. No. 6,359,249 in turn claiming priority from U.S. Provisional Patent Application Serial No. 60/095, 385 filed Aug. 5, 1998, and now expired; U.S. patent application Ser. No. 09/557,896, filed Apr. 21, 2000, now abandoned and claiming priority from U.S. Pat. No. 5,742, 022, filed Apr. 19, 1995, and from U.S. Pat. No. 6,066,824, filed Apr. 20, 1998, all commonly owned with this application and incorporated herein by reference in their entirety.

FIELD OF THE INVENTION

The present invention relates to electric welding assemblies having multiple weld gun arms for producing multiple simultaneous welds in a single pass. In particular, the present invention relates to assemblies where one arm of a multiple arm weld gun is retractable.

BACKGROUND OF THE INVENTION

Resistance welding utilizes the flow of electricity to permanently join two or more overlapping metallic work pieces to one another. Typically, the metallic work pieces are placed between two opposing electrode tips, which are on the jaws of a weld gun arm. The electrodes are then forced together until their tips contact the outer surfaces of the work pieces at a pressure sufficient to sandwich the work pieces and ensure an adequate electrical contact between the electrode tips and the work pieces. An electrical current is induced to flow from one electrode tip to the other electrode tip by way of the sandwiched work pieces. The work pieces act as conductors in the resulting electrical circuit, and resistance to the flow of electrical current at the interfaces between the metals generates heat. The affected metal of each work pieces selectively becomes molten, and interacts with molten metal of an adjacent work pieces to form a weld nugget that permanently bonds the work pieces together at the point of electrode tip contact.

A number of factors relate to the creation of a weld nugget, including the force and area of contact between the electrode tips and the work pieces, the level of current flow, the length of time the current flow lasts, degree of work pieces imperfection, and even the condition of the electrode tips themselves.

Weld guns used in manufacturing processes typically are required to make multiple consecutive welds on a given work pieces. In such a situation, devices exist for moving the work pieces between individual welds, moving the weld gun between individual welds, or both. For example, the electric welding gun may cycle through various locations, i.e. between an operational position with a work pieces and a resting position. The work pieces may be placed on a moving platform that manipulates the work pieces for a welding operation with a movable weld gun. After the work pieces is manipulated, the weld gun may move toward the work pieces to perform a weld cycle, after which the weld gun moves away from the work pieces to allow movement of the piece and manipulation of the next piece to be welded. In some applications, the weld gun must make a significant number of consecutive welds before further manipulation of the work pieces. In such applications, the amount of time required to move the weld gun to make the consecutive welds becomes a rate limiting step.

It is known to mount multiple weld gun arms to a single weld gun to decrease the amount of time required to make a significant number of consecutive welds. For example, simply adding one additional gun arm to a weld gun such that both arms are capable of simultaneous welding operation cuts the time required for performing a series of multiple consecutive welds nearly in half. Multiple arm weld guns, usually in the form of dual arm weld guns, have the advantage of being able to make several welds at one time, which decreases the cycle period of the weld gun assembly. In current multiple arm weld gun systems, artificial intelligence controls the weld gun arm position process during a weld cycle by first operationally orienting the multiple arm weld gun to the work pieces. The process includes creating welds by closing electrode tips of the weld guns about the work pieces, creating welds, reorienting the multiple arm weld gun with respect to the work pieces, and creating additional welds. Multiple arm weld guns are thus able to complete more than one weld at once, depending upon the number of weld arms on the weld gun, thereby shortening the period of time it takes to complete all the welds on a work pieces. As a result, the weld cycle period is shortened, i.e. the period of time from the beginning of one work pieces to the beginning of the next work pieces is decreased.

However, conventional multiple arm weld guns have a significant disadvantage due to their increased size over single arm assemblies, which are required to accommodate multiple arms on a weld gun. Specifically, currently known multiple arm weld guns are not suitable for welding many types of work pieces, because the multiple arm weld gun cannot make welds in spatially restricted locations of mated work pieces if the weld gun has difficulty gaining access to the work pieces where the weld is required.

One solution to the problem of the too-large-multiple arm-weld-gun is to use a second, single arm weld gun that can be accommodated in the spatially restricted space. However, this provides unsatisfactory results because of the added inefficiencies of using two weld guns. The purpose of multiple arm weld guns is to reduce the number of required weld guns, not to increase the number. The added, single arm weld gun would be similarly expensive to design, maintain, and operate as the multiple arm weld gun. In addition, the introduction of a second separate weld gun would unduly increase the cycle period because one weld gun would have to be moved out of the way in order of the other weld gun to move into its welding position.

Accordingly, there is a need to provide an improved electric welding system that minimizes or eliminates one or more the problems set forth above.

SUMMARY OF THE INVENTION

A multiple arm weld gun is provided wherein one or more weld gun arms on the multiple arm weld gun are able to retract away from a work pieces while at least one other arm remains operational, thus allowing a multiple arm weld gun to act as a single arm weld gun. As a result, once one or more weld gun arms are retracted, the remaining weld gun arms may be repositioned with respect to the work pieces in a space not previously accessible to the multiple arm weld gun before retraction of an arm. While all weld gun arms may be retractable, preferably only at least one arm is not retractable. The ability to retract all but one of the weld gun arms effectively overcomes the problem of multiple arm weld guns that are too large, without requiring the use of a separate single arm weld gun.

DETAILED DESCRIPTION OF PREFERRED EMBODIMENTS

In all weld guns, at least one actuator is required per weld gun arm to provide the force necessary to make a weld stroke, which includes opening and closing the jaws of the weld gun arm at the spot of the weld on an engaged work pieces and providing the necessary compressive force to achieve a tight electrical contact between the electrode and the work pieces. For example, in a dual arm weld gun, at least two actuators are required, i.e. one for each weld gun arm. Any known actuators may be used, as well as any known toggle link and actuator combination. U.S. application Ser. No. 09/715,343, filed Nov., 17, 2000[Attorney docket number 65012-0063] depicts various actuators in combination with links and pivotable members, and is incorporated herein by reference in its entirety. In the present invention, the actuator also provides the force necessary to rotate a weld gun arm to a retracted position from an extended position.

Figure 1:
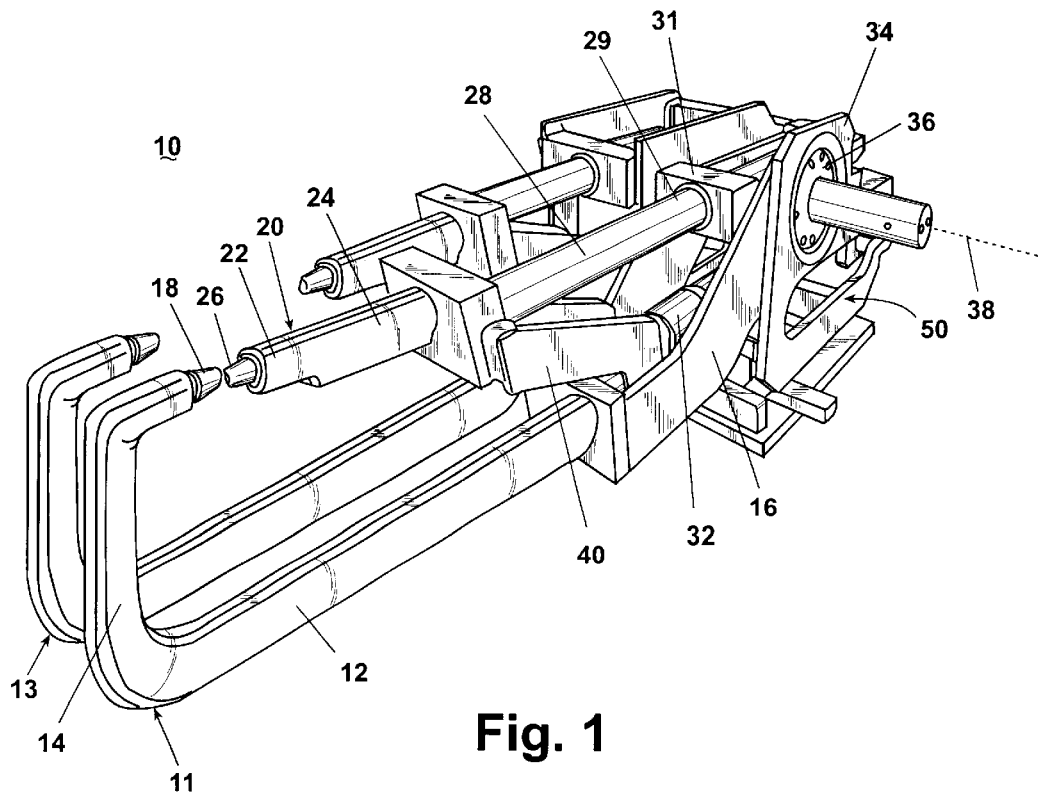
FIG. 1 is perspective view of a dual arm weld gun.
Figure 2:
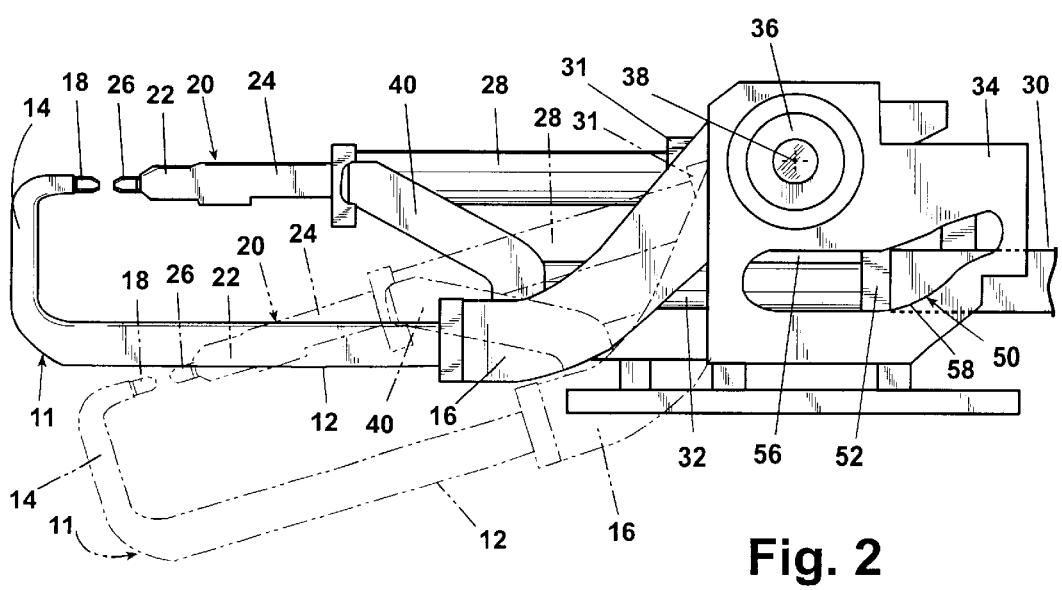
FIG. 2 is a side view of a dual arm weld gun.

Referring now to FIGS. 1 and 2, a dual arm weld gun 10 includes a first C-shaped weld gun arm 11 having a generally C-shaped fixed jaw 12 in combination with a second C-shaped weld gun arm 13 to form a multiple weld gun arm. It should be understood that more than two weld gun arms may be interconnected to form a multiple arm weld gun. Additionally, while the below description is directed primarily to only first C-shaped weld gun arm 11, it should be understood that the description may apply to one or more arms of a multiple arm weld gun.

Fixed jaw 12 of first weld gun 11 includes a first end 14, a second end 16 and an electrode tip 18 at a distal end of the first end 14. Weld gun arm 11 also includes a moveable jaw 20 having a first end 22, a second end 24, an electrode tip 26 at a distal end of the first end 22, and a guide 28 that is preferably linear. Linear guide structure 28 includes a guide rail 29 received in a bracket 31, which ensures that during normal welding operation, movable jaw 20 moves only along a fixed, preset path.

Weld gun arm 11 further comprises an actuator 30 having an actuator shaft 32 connected to movable jaw 20. In FIGS. 1 and 2, shaft 32 is fixedly connected to movable jaw 20 through connector 40. The size and shape of connector 40 may vary as necessary to prevent unwanted interaction between shaft 32 of the actuator 30 and guide 28. In a preferred construction, actuator 30 is a linear actuator capable of moving only in a fore and aft direction during normal operation. As such, the interconnection of shaft 32 with connector 40 and of connector 40 to movable jaw 20 limits movement of the movable jaw 20 to only a fixed, preset path that is preferably linear during normal operation.

Structurally, in the embodiment shown in FIGS. 1 and 2, fixed jaw 11 is connected to at least one mounting bracket 34 at the second end 16 of the fixed jaw 11. Preferably, bracket 31 of the linear guide structure 28 is also connected to mounting bracket 34 at a locking joint that allows rotational movement, such as by a clutch plate 36. Preferably, clutch plate 36 is mounted on bracket 34 having a central axis of rotation 38 defined through the center of the clutch plate 36. As best seen in FIG. 2, both fixed and movable jaws 11, 20 are operably connected to the clutch plate 36 for rotational movement about axis 38. In particular, second ends 16 of fixed jaw 11 enclose portions of linear guide 28 attached to the movable jaw 20. The connector 40 also serves to operably interconnect actuator 30 with fixed and movable jaws 11, 20. As a result, the entire weld gun arm, including fixed and movable jaws 11, 20 as well as the actuator 30 and actuator shaft 32, is functionally connected to clutch plate 36 on bracket 34.

Under normal operation, clutch plate 34 is locked against rotation about axis 38. As a result, a work pieces may be positioned between electrodes 18, 26. Movable electrode 26 on movable jaw 20 is cycled on a fixed, preset path, preferably linear, by operation of actuator 30. In particular, actuator 30 cycles actuator shaft 32 fore and aft as necessary to accomplish welding. Since shaft 32 is operably connected to movable jaw 20, movable jaw 20 likewise cycles fore and aft in response to movement of shaft 32. Thus, as actuator 30 extends the actuator shaft 32 in a first direction, the distance between the electrode tips 18, 26 decreases until the electrode tips are in an engaged position in contact with the work pieces (not shown). Electricity is passed between the electrode tips 18, 26 and through the work pieces to create the weld nugget. This is the weld stroke. After the weld has been completed, the actuator 30 withdraws the actuator shaft 32 in a second direction to release the work pieces and return the weld gun 10 to a disengaged position, depicted in FIGS. 1 and 2. The normal weld stroke may be repeated as necessary until such time that a weld is needed in a spatially restricted portion of the work pieces. Then a retraction stroke takes place, as described below, to retract weld gun 10 to allow the remaining unencumbered weld gun arm to continue normal operation creating additional welds on the work pieces.

As necessary, the actuator 30 may withdraw the actuator shaft 32 in the disengaged direction beyond the disengaged position to provide the force necessary to rotate the weld gun arm 11 including jaws 12 and 20 to a retracted position. As noted above, all structural components of the weld gun arm 10 are operably connected to the clutch plate 36, which is normally locked against rotation.

During a retraction stroke, the clutch plate 36 disengages, thereby allowing rotation of weld gun 10 about axis 38, while actuator 30 provides the force necessary to rotate the gun. Clutch plate 36 may be electrically engaged and spring disengaged, or vice versa, or may use any suitable engagement and disengagement mechanism. When retraction is desired, actuator 30 withdraws actuator shaft 32 beyond the disengaged position. As actuator shaft 32 is withdrawn further toward a retracted position, not only does the actuator create a linear force along its path of movement, it also causes a downward force to be exerted on the jaws 12, 20. Because the actuator 30 and the plate 36 are offset from one another and the main force of the actuator does not pass through the axis 38, the downward force exerted on jaws 12, 20 causes rotation the plate 36, thereby causing the weld gun 10 to rotate in a downwardly direction, as shown in phantom in FIG. 2. As it rotates downwardly, the weld gun arm 11 is moved to a retracted position such that the arm 11 will not interfere with the remaining arm 13 as it performs additional welds in a confined space on mating work pieces. In this way, a dual arm weld gun may quickly, easily and reversibly be transformed into a single weld gun arm, or into a weld gun utilizing less than all of its weld gun arms if there are more than two arms.

In an alternative embodiment, bracket 34 further includes a cam track 50 formed at a point on bracket 34 adjacent actuator 30 or actuator shaft 32. A cam follower 52 is affixed along the longitudinal length of the actuator shaft 32 and is slidably engaged in the cam track 50. Cam track 50 includes a predetermined cam surface 54 along which cam follower 52 slides. In general, the cam track 50 includes two portions, but any conventional design may be employed. A first portion 56 of the cam track 50 is preferably linear and parallel to the normal position of both linear guide 28 and actuator shaft 32. During normal operation of the actuator, cam follower 52 resides only in the first portion 56 of cam track 50, which defines motion between engaged and disengaged positions. A second portion 58 of the cam track 50 is preferably arcuately shaped to define a path of travel for gun 10 during a retraction operation, as described more fully below. As actuator shaft is withdrawn further toward and through the retracted position, cam follower 52 moves within cam track 50 from the generally linear first portion 56 to the arcuate second portion 58. Arcuate second portion 58 of cam track 50 is designed and shaped to cause gun 10 to rotate about axis 38. In particular, as actuator shaft 32 is withdrawn so that cam follower 52 engages second portion 58 of the cam track 50, all portions of weld gun 10 that are operationally connected to clutch plate 36 rotate with clutch plate 36 about axis 38. In FIG. 1, the second portion 58 of cam track 50 angles upwardly with respect to actuator shaft 32, thereby causing the assembly to rotate in a downwardly direction, as shown in phantom in FIG. 2.

The weld gun 10 of FIGS. 1 and 2 utilizes a linear actuator to translate linear motion into rotation of the weld gun 10 about a rotational joint. However, other conventional types of pivoting or rotational joints are also suitable, such as joints that facilitate a linear sliding motion or a corkscrew motion.

Preferably, a single stage actuator or motor is used to provide the force and movement required for both the weld stroke and the retraction stroke by working in combination with the locking joint. Alternately, a two stage actuator or motor may be used to effect both the weld stroke and the retraction stroke. A strategically placed stop or appropriately designed cam track may also be utilized to facilitate a retraction stroke using a two stage actuator.

Figure 3:
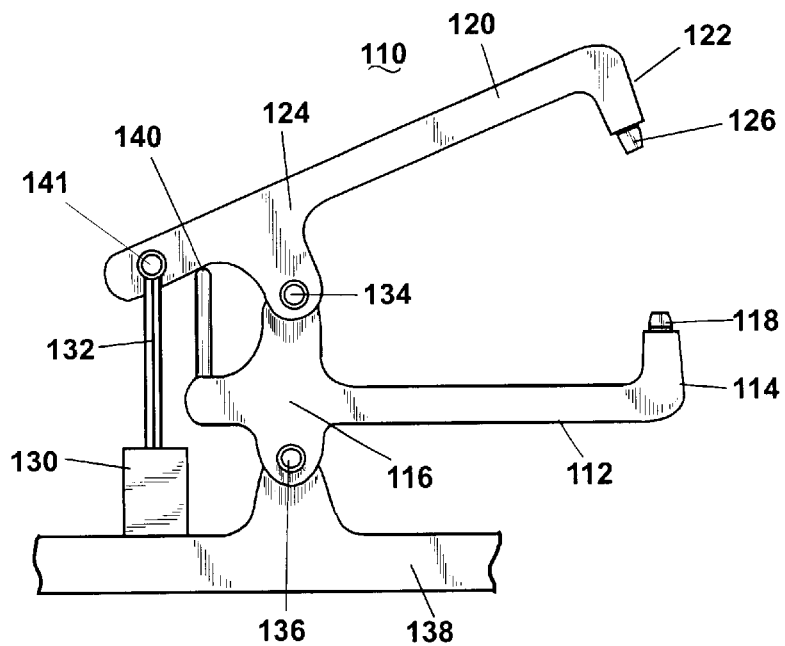
FIG. 3 is a side view of a second embodiment.

A retractable weld gun utilizing a two stage actuator is shown in FIG. 3. A caliper-type weld gun arm 110 is shown, representing one arm of a multiple arm weld gun. Weld gun arm 110 includes a fixed jaw 112 having a first end 114 and a second end 116. Fixed jaw first end 114 terminates in electrode tip 118. The weld gun arm 110 further includes a moveable jaw 120 having a first end 122 inwardly directed towards fixed jaw first end 114, a second end 124. Movable jaw first end 122 likewise terminates in an electrode tip 126 in a position opposed to tip 118. Fixed and movable jaws are rotationally interconnected at a connection point 134 such that opposed electrodes 118, 126 may rotationally move toward and away from each other during a weld stroke. Fixed jaw 112 is further connected to a mounting bracket 138 at a selectively lockable second connection point 136. Second connection point 136 usually acts as a rigid connection point that selectively prevents rotation of fixed jaw 112 about the second connection point. However, if further retraction of gun 110 is required, second connection point 136 may be unlocked to act as a rotational connection similar to first connection point 134, thereby allowing fixed jaw 112 to rotate about second connection point 136, as described further below.

Weld gun arm 110 further includes an actuator 130, preferably mounted on bracket 138, having an actuator shaft 132. Actuator shaft 132 is rotationally connected at a third connection point 141 to the second end 124 of the moveable jaw 120. A stop 140 is connected to the second end 116 of the fixed jaw 112.

Under normal operation, actuator 130 extends shaft 132, forcing movable jaw 120 to rotate about first connection point 134, thereby decreasing the distance between tips 118, 126 until the electrode tips are in contact with the work pieces (not shown) in an engaged position. Electricity is passed between the electrode tips 118, 126 and through the work pieces to create the weld nugget. This is the weld stroke. After the weld has been completed, the actuator 130 withdraws the actuator shaft 132 to a disengaged position to release the mated work pieces so that arm 110 or the work pieces may be repositioned with respect to the other. This weld stroke may be repeated until such time that a weld is needed in a spatially restricted portion of the work pieces. Then a retraction stroke takes place, as described below, after which, the remaining weld gun arm or arms may create additional welds on the work pieces.

To retract a weld gun arm, second connection point 136 selectively disengages from a rigid connection to a rotatable connection. Selective engagement and disengagement of second connection point 136 may be accomplished by any conventional means. Under normal operation, the maximum withdrawal of actuator shaft 132, and by association, the maximum distance between electrode tips 118, 126, is limited by stop 140. However, by selectively disengaging second connection point 136, continued withdrawal of the actuator shaft 132 by the actuator 130 forces the combined fixed jaw 112 and moveable jaw 120 to rotate as a single unit about both first connection point 134 and second connection point 136. The linear motion of the actuator 130 is thereby translated into rotational motion of the jaws 112, 120, causing both jaws to rotate upwardly with respect to bracket 138 in FIG. 3. The rotation about the connections 134, 136 effectively swings the weld gun arm away from the work pieces so that additional welds may be made on a spatially restricted portion of the work pieces.

The cam track/cam follower mechanism used in FIGS. 1 and 3 may also be adapted to bayonet style weld guns. In such a configuration, a cam follower is fixedly attached to a moveable jaw of bayonet style weld gun arm, while a cam track is located on a fixed jaw of the weld gun arm. In a first portion, the cam track is straight and guides the movable jaw along a fixed, preset preferably linear path between a disengaged and an engaged position. A second portion of the cam track is preferably angled away from the first portion, causing the movable jaw to retract in response to action of the cam follower within the cam track.

Figure 4:
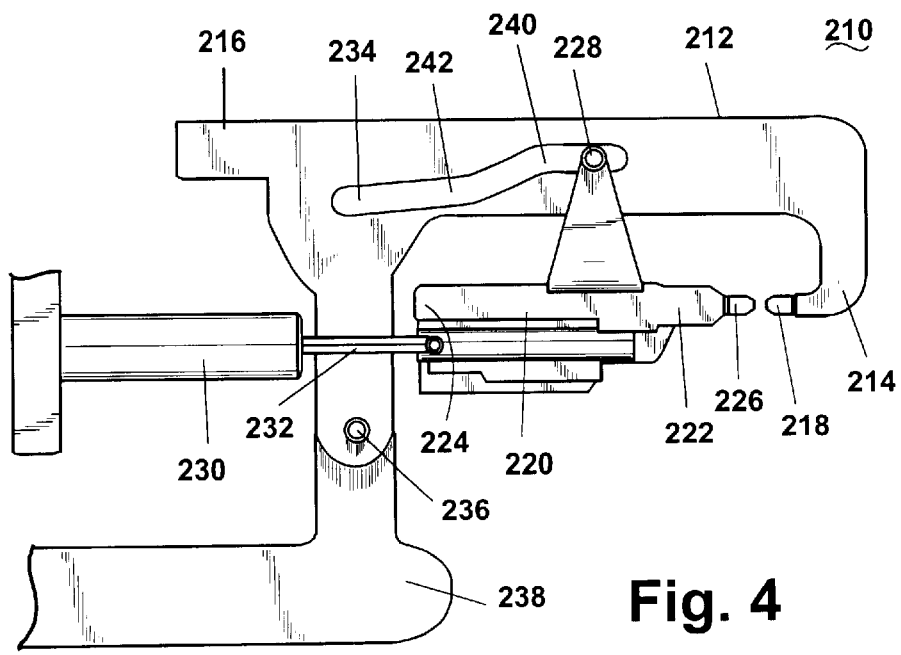
FIG. 4 is a side view of a third embodiment.

A bayonet style weld gun 210 is shown in FIG. 4. As above, gun arm 210 is only one arm of a multiple arm weld gun. The weld gun arm 210 comprises a generally C-shaped fixed jaw 212 having a first end 214 terminating in an electrode tip 218 and a second end 216. Fixed jaw 212 is pivotally mounted at connection point 236 to a mounting bracket 238. The weld gun arm 210 further includes a moveable jaw 220 having a first end 222 and a second end 224. Movable jaw first end 222 terminates in an electrode tip 226 such that tips 218, 226 are arranged in an opposed manner. Movable jaw 220 further includes a cam follower 228 mounted on a bracket 229 as necessary such that the cam follower slidably engages a cam track 234 located on fixed jaw 212. An actuator 230, moving along a fixed, preset path, and preferably a linear actuator having an actuator shaft 232, is connected to the movable jaw second end 224 to impart fore and aft motion to the movable jaw 220.

In operation, as actuator 230 extends the actuator shaft 232, movable jaw 220 moves generally linearly towards fixed jaw first end 214. Movable jaw 220 is guided in its motion through the action of cam follower 228 sliding within cam track 234. As shaft 232 moves from a disengaged to an engaged position, the distance between the electrode tips 218, 126 decreases until the electrode tips are in contact with the work pieces (not shown). Electricity is passed between the electrode tips 218, 226 and through the work pieces to create the weld nugget. This is the weld stroke. After the weld has been completed, the actuator 230 withdraws the actuator shaft 232 to release the work pieces and return the weld gun arm 210 to a disengaged position. This weld stroke may be repeated until such time that a weld is needed in a spatially restricted portion of the work pieces. Then a retraction stroke takes place, as described below, after which, any remaining weld gun arms may create additional welds on the mated work pieces.

As noted above, cam track 234 has two portions. A first portion 240 is generally linear and parallel to the motion of the actuator 230, thereby describing a fixed, preset path corresponding to normal operation. The cam follower 228 slides in this portion of the cam track 234 without significantly moving the fixed jaw 212 because the fixed length cam follower 228 is moving parallel to the motion of the actuator 230. A second portion 242 of the cam track 234 angles toward the moveable jaw 220 to cause the fixed jaw 212 to pivot about connection 232 as the fixed jaw 212 is drawn toward the movable jaw 222. Thus, the motion of the fixed jaw 212 during the retraction stroke is defined by the shape of the cam track 234.

Although certain preferred embodiment of the present invention have been described, the invention is not limited to the illustration described and shown herein, which are deemed to be merely illustrative of the best modes of carrying out the invention. A person of ordinary skill in the art will realize that certain modifications and variation will come within the teachings of this invention and that such modifications and variations will come within its spirit and the scope as defined by the claims.

What is claimed is:

1. A weld gun comprising:
    at least two weld gun arms capable of simultaneous welding operation; and
    an actuator attached to at least one of said weld gun arms for moving said weld gun arms between an engaged and a disengaged position, said actuator further capable of moving said at least one of said weld gun arms to a retracted position without interfering with operation of the remaining weld gun arms.
2. The weld gun of claim 1, wherein said at least one of said weld gun arms is selectively retractable.
3. The weld gun of claim 2, wherein each weld gun arm further comprises:
    first and second jaws, wherein said actuator is connected to said first jaw for imparting movement to said first jaw along a fixed, preset path from a disengaged to an engaged position, said actuator further capable of moving said first and second jaws to said retracted position.
4. The weld gun of claim 3, wherein both of said jaws are moved to said retracted position.
5. The weld gun of claim 3, wherein said first arm further comprises:
    a cam follower fixedly formed thereon, said cam follower slidably received in a cam track to guide movement of said first and second jaws, said cam track including first and second portions, said first portion sized and shaped to define movement of said first jaw between engaged and disengaged positions, said second portion sized and shaped to define movement of said second jaw between retracted and unretracted positions.
6. The weld gun of claim 1, wherein said actuator is a linear actuator.
7. The weld gun of claim 6, wherein said linear actuator imparts a rotational movement to said first and second jaws when said actuator moves at least one of said jaws to said retracted position.
8. The weld gun of claim 6, further including a selectively lockable pivotable joint, wherein said weld gun arm rotates about an axis of said pivotable joint when said actuator moves said arm to said retracted position.
9. The weld gun of claim 6, wherein said actuator further comprises:
    an actuator shaft having a cam follower fixedly formed thereon, said cam follower slidably received in a cam track to guide movement of said actuator shaft, said cam track including first and second portions, said first portion sized and shaped to define movement of said actuator shaft between engaged and disengaged positions, said second portion sized and shaped to define movement of said actuator shaft between retracted and unretracted positions.
10. The weld gun of claim 9, wherein said cam track is formed adjacent said shaft.
11. The weld gun of claim 10, wherein said cam track is formed on said second jaw.
12. A weld gun comprising:
    at least two weld gun arms, each arm including opposed electrodes for creating welds on a work pieces;
    at least one of said weld gun arms further including:
        first and second jaws, said first jaw rotationally connected to said second jaw at a first connection point, said first jaw further connected to an actuator, whereby movement of said actuator along a fixed, preset path imparts rotational movement of said first jaw with respect to said second jaw about said first connection point, and
        said actuator further capable of moving said first jaw rotationally about said first connection point away from said second jaw to a first jaw retracted position.
13. The weld gun of claim 12, wherein said second jaw is rotationally connected to a mounting bracket about a second connection point, whereby said actuator is capable of moving said second jaw rotationally about said second connection point to a second jaw retracted position.
14. A weld gun comprising:
    at least two weld gun arms, each arm including opposed electrodes for creating welds on a work pieces;
    one of said weld gun arms further including:
        first and second jaws, said first jaw rotationally connected to said second jaw at a first connection point, said first jaw further connected to a first actuator, whereby movement of said first actuator along a fixed, preset path imparts rotational movement of said first jaw with respect to said second jaw about said first connection point, and a second actuator, said second actuator further capable of moving said first jaw rotationally about said first connection point away from said second jaw to a first jaw retracted position.

15. The weld gun of claim 14, wherein said second jaw is rotationally connected to a mounting bracket about a second connection point, whereby said second actuator is capable of moving said second jaw rotationally about said second connection point to a second jaw retracted position.

* * * * *